(12) United States Patent
Qin et al.

(10) Patent No.: US 8,970,462 B2
(45) Date of Patent: Mar. 3, 2015

(54) LIQUID CRYSTAL DISPLAY PANEL AND LIQUID CRYSTAL DISPLAY

(75) Inventors: Guangkui Qin, Beijing (CN); Jaegeon You, Beijing (CN); Teruaki Suzuki, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 233 days.

(21) Appl. No.: 13/491,158

(22) Filed: Jun. 7, 2012

(65) Prior Publication Data

US 2012/0313918 A1    Dec. 13, 2012

(30) Foreign Application Priority Data

Jun. 9, 2011  (CN) .......................... 2011 1 0154449

(51) Int. Cl.
| | | |
|---|---|---|
| *G09G 3/36* | (2006.01) | |
| *G02F 1/1335* | (2006.01) | |
| *G02F 1/13363* | (2006.01) | |
| *G02F 1/139* | (2006.01) | |

(52) U.S. Cl.
CPC ...... *G02F 1/133555* (2013.01); *G02F 1/13363* (2013.01); *G02F 1/1395* (2013.01); *G02F 2001/133638* (2013.01); *G02F 2413/04* (2013.01); *G02F 2413/11* (2013.01); *G02F 2413/12* (2013.01)
USPC .................................. 345/87; 345/211; 345/82

(58) Field of Classification Search
CPC ................... G02F 1/133555; G02F 1/133634; G02F 2413/04; G02F 2413/12; G02F 2413/11; G02B 27/286; G02B 1/118; H01L 27/12; H01L 27/3244

USPC ............ 345/211, 87, 82, 83, 88; 349/98, 102, 349/119, 96
See application file for complete search history.

(56) References Cited

U.S. PATENT DOCUMENTS

| | | | |
|---|---|---|---|
| 2003/0193635 A1* | 10/2003 | Mi et al. .......................... 349/117 |
| 2005/0035353 A1* | 2/2005 | Adachi et al. .................... 257/72 |
| 2006/0119766 A1* | 6/2006 | Mi et al. .......................... 349/96 |
| 2007/0279561 A1 | 12/2007 | Lin |
| 2008/0024700 A1 | 1/2008 | Yoshimi |

(Continued)

FOREIGN PATENT DOCUMENTS

| CN | 1740854 A | 3/2006 |
|---|---|---|
| CN | 101114075 A | 1/2008 |

(Continued)

OTHER PUBLICATIONS

First Chinese Office Action dated Apr. 9, 2014; Appln. No. 201110154449.X.

(Continued)

*Primary Examiner* — Thuy Pardo
(74) *Attorney, Agent, or Firm* — Ladas & Parry LLP

(57) ABSTRACT

This disclosure provides a liquid crystal display panel, comprising a first polarizer sheet, a liquid crystal layer and a second polarizer sheet from the bottom up in this order. A first biaxial ¼ wave plate and a first biaxial ½ wave plate for expanding the wavelength range of the first biaxial ¼ wave plate are provided, in order from the top down, between the liquid crystal layer and the first polarizer sheet; and a second biaxial ¼ wave plate and a second biaxial ½ wave plate for expanding the wavelength range of the second biaxial ¼ wave plate are, in order from the bottom up, between the liquid crystal layer and the second polarizer sheet.

8 Claims, 3 Drawing Sheets

(56) References Cited

U.S. PATENT DOCUMENTS

| | | | |
|---|---|---|---|
| 2009/0161044 A1* | 6/2009 | Ge et al. | 349/98 |
| 2010/0072880 A1* | 3/2010 | Adachi et al. | 313/498 |
| 2010/0201924 A1* | 8/2010 | Wu et al. | 349/102 |

FOREIGN PATENT DOCUMENTS

| | | |
|---|---|---|
| CN | 101441352 A | 5/2009 |
| CN | 102087446 A | 6/2011 |
| JP | 2003-207782 A | 7/2003 |
| KR | 20080047689 A | 5/2008 |

OTHER PUBLICATIONS

Second Chinese Office Action dated Sep. 12, 2014; Appln. No. 201110154449.X.

* cited by examiner

LIQUID CRYSTAL DISPLAY PANEL AND LIQUID CRYSTAL DISPLAY

BACKGROUND

One or more embodiments of the present disclosure relates to a liquid crystal display panel having a viewing angle compensation construction.

The consuming market for liquid crystal display panels grows rapidly due to the advantages such as light and thin profile, low power consumption, low driving voltage, no radiation, high-luminance, and high-contrast etc. Liquid crystal display panels have been applied to more and more applications such as cellular phones, PDAs (personal digital assistants), computers, television etc. One research trend for improving display effect is to increase the view angle of liquid crystal display panels.

When watching the liquid crystal display panel in an oblique view direction other than the azimuth angles of 0° and 90°, both the directions of the transmission axis of a polarizer sheet and the optical axis of a liquid crystal layer may deflect, causing light leakage, therefore, there exist unsatisfactory contrast and view angle experience along such angles.

SUMMARY

One or more embodiments of the disclosure is to provide a liquid crystal display panel with increased viewing angle.

One aspect of this disclosure provides a liquid crystal display panel, comprising a first polarizer sheet, a liquid crystal layer and a second polarizer sheet from the bottom up in this order. A first biaxial ¼ wave plate and a first biaxial ½ wave plate for expanding the wavelength range of the first biaxial ¼ wave plate are provided, in order from the top down, between the liquid crystal layer and the first polarizer sheet; and a second biaxial ¼ wave plate and a second biaxial ½ wave plate for expanding the wavelength range of the second biaxial ¼ wave plate are, in order from the bottom up, between the liquid crystal layer and the second polarizer sheet.

Another aspect of the disclosure provides a liquid crystal display comprising the above-mentioned liquid crystal display panel.

The liquid crystal display panel provided by the embodiment of present disclosure may make compensation for the viewing angle of the liquid crystal display panel, improve viewing angle characteristics of liquid crystal display panel and the display effect thereof as well through the wave plates positioned in the liquid crystal display panel.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only, and thus are not limitative of the present disclosure and wherein.

DETAILED DESCRIPTION

The objects, solutions and advantages of the embodiments of present disclosure will be more apparent from the following detailed description in connection with the accompanying drawings. Herein, the exemplary embodiments are for the purpose of illustration and by not limitative.

The configuration for the liquid crystal display panel provided by embodiment of present disclosure may make compensation for viewing angle of liquid crystal display panel, improve viewing angle of liquid crystal display panel and refine its display effect, through special wave plates positioned in the liquid crystal display panel.

Figure 1:
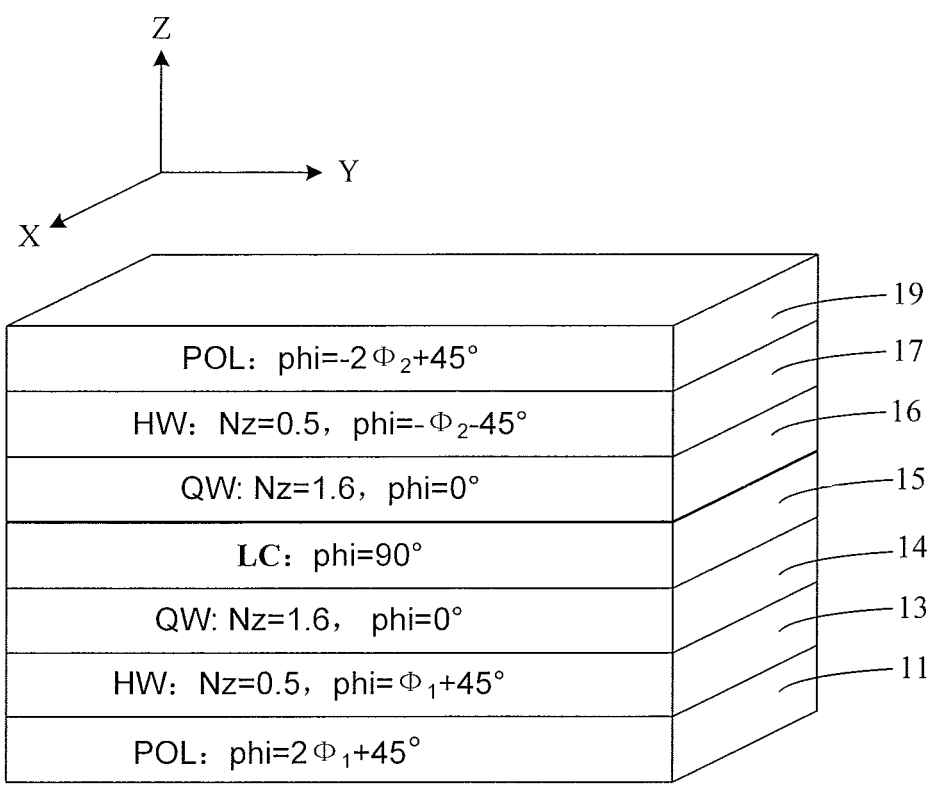
FIG. 1 is a structural schematic view of a liquid crystal display panel according to one embodiment of this disclosure.

Firstly, as shown in FIG. 1, the liquid crystal display panel according to one embodiment of present disclosure is provided with a first polarizer sheet 11 on the lower side, a liquid crystal layer 15 in the middle, and a second polarizer sheet 19 on the upper side. The liquid crystal display panel is further provided with, in order from the top down between the liquid crystal layer 15 and the first polarizer sheet 11: a first biaxial ¼ wave plate ($\lambda/4$ plate) 14; and a first biaxial ½ wave plate ($\lambda/2$ plate) 13 for expanding the wavelength range of the first biaxial ¼ wave plate.14.

Further, there are provided with, in order from the bottom up between the liquid crystal layer 15 and the second polarizer sheet 19: a second biaxial ¼ wave plate 16; and a second biaxial ½ wave plate 17 for expanding the wavelength range of the second biaxial ¼ wave plate 16.

Figure 4:
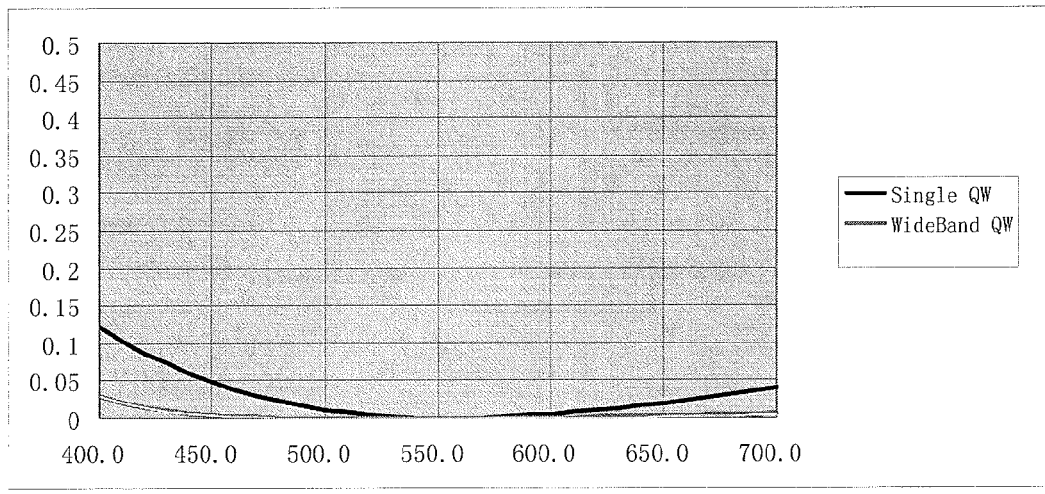
FIG. 4 is a diagram showing the effect of wavelength expansion of the wavelength-expanding ¼ wave plate.

In the configuration shown in FIG. 1, the first biaxial ½ wave plate 13 can expand the wavelength range of the first biaxial ¼ wave plate 14, thus the combination of the first biaxial ½ wave plate 13 and the first biaxial ¼ wave plate 14 can achieve the effect of a wavelength-expanding ¼ wave plate. Likewise, the second biaxial ½ wave plate can expand the wavelength range of the second biaxial ¼ wave plate 16, thus the combination of the second biaxial ½ wave plate 17 with the second biaxial ¼ wave plate 16 can achieve the effect a wavelength-expanding ¼ wave plate. For example, when the wavelength with which the ¼ wave plate is used for is 550 nm, the resultant wavelength range from the above combination can be expanded. Generally, the visual light is in the range of about 380~780 nm. The wavelength-expanding ¼ wave plate can reduce light leakage at other wavelengths in a dark state compared with a conventional ¼ wave plate. Typically, in a dark state, if light is at the wavelengths having higher transmissivity, light leakage is bigger. As shown in FIG. 4, obviously the light has less leakage after wavelength expansion of the wavelength-expanding ¼ wave plate. At the same time, the first biaxial ¼ wave plate 14 and the second biaxial ¼ wave plate 16 can further, beside as a ¼ wave plate respectively, make compensation for the variation of phase delay amount in the oblique view directions for liquid crystal in the dark-state. With the expansion of wavelength range and the compensation for the variation of phase delay amount in the oblique view directions for liquid crystal, the above configuration therefore can remedy the light leakage in the oblique view directions of the liquid crystal display panel, improving the viewing angle characteristic of liquid crystal display panel effectively.

Various wave plates described in the embodiments of the disclosure can be biaxial optical layers (biaxial layer) made of a material of biaxial optical property. The wave plates are typically formed in thin films of transparent materials and have different refractive indexes in the thickness direction and other directions from each other. These different optical characteristics can be controlled in the drawing (stretching) process to form the wave plates. The different functions of the wave plates are determined by different process parameters. FIG. 1 showing the configuration of this embodiment further gives out the biaxial factors ($N_Z$ factors) of various wave plates and the azimuth angles of various layers with respect to a preset coordinate system. In FIG. 1, "HW" refers to a ½ wave plate, "QW" represents a ¼ wave plate, "phi" means an azimuth angle, and "$N_Z$" means a biaxial factor. As to the wave plates and liquid crystal layer, the azimuth angle thereof may be the azimuth angle of the slow axis thereof; while as to polarizer sheets, the azimuth angle thereof may be the azimuth angle of the transmission axis (or the absorption axis).

Azimuth angle is a way for the measurement of the angle difference between objects within a plane, for example, an angle between a northward extending line starting from a certain point to the target extending line in the clockwise direction. The azimuth angle phi shown in FIG. 1 is an azimuth angle measured in on the X-Y plane in a three-dimensional coordinate system which is constructed by using the thickness direction of the liquid crystal panel as the Z-direction. It can be seen that, when the Z-direction is defined, the orientations of the X-axis, Y-axis on the X-Y plane of this three-dimensional coordinate system can still be varied; therefore, the azimuth angle of each layer shown in FIG. 1 is only a relative angle on the X-Y plane of a preset three dimensional coordinate system. Although the azimuth angles of each layer in different coordinate systems may not be the same, the azimuth angle difference between any two layers is kept constant as the coordinate system varies.

In this embodiment, the azimuth angle of the first polarizer sheet 11 is set to 2 $\Phi_1$+45° for example. In this case, the azimuth angle of the first biaxial ½ wave plate 13 is $\Phi_1$+45°, and the numeric range for the biaxial factor $N_Z$ is 0.2~0.6.

The azimuth angle of the first biaxial ¼ wave plate 14 is 0°, and the numeric range for the biaxial factor $N_Z$ is 1.3~1.9.

The azimuth angle of the liquid crystal layer 15 is 90°.

The azimuth angle of the second biaxial ¼ wave plate 16 is 0°, and the numeric range for the biaxial factor $N_Z$ is 1.3~1.9.

The azimuth angle of the second biaxial ½ wave plate is $-\Phi_2-45°$, and the numeric range for the biaxial factor $N_Z$ is 0.4~0.6.

The azimuth angle of the second polarizer sheet 19 is $-2\Phi_2+45°$.

The numeric ranges for both $\Phi_1$ and $\Phi_2$ is 10°~30°, the biaxial factor $N_Z=(n_x-n_z)/(n_x-n_y)$, where $n_x$, $n_y$ and $n_z$, are refractive indexes of respective wave plate along the X-axis, Y-axis, and Z-axis, respectively. Here the X-axis, Y-axis, and Z-axis refer to three principal optical axis of the optical material for respective wave plate, which material is of biaxial optical property, where the Z-axis is same as the direction of the thickness direction of the panel.

The numeric range for the biaxial factors of the above first biaxial ½ wave plate 13 and second biaxial ½ wave plate are 0.2~0.6. When viewed along a non-vertical direction, the optical axial angle of a typical anisotropic material may give rise to a certain variation, and in this embodiment, a material, the biaxial factor of which is about 0.5, is employed for the first biaxial ½ wave plate 13 and second biaxial ½ wave plate 17. An example of the material is Poly(ethylene 2,6-naphthalate (PEN), which may be processed to form the wave plate. Such a material of such parameter characteristics has no or little variation along a non-vertical optical axis.

In this embodiment, the display mode of the liquid crystal display panel may be, for example, transflective type optically compensated bend arrangement (OCB) display mode or transflective type electrically controlled birefringence (ECB) display mode. In the above display modes, the arrangement of liquid crystal molecules in a dark-state is in a vertical arrangement mode, and at this time, the $N_Z$ factor of the liquid crystal layer corresponds to negative infinity; in order to make compensation for the optical axis deflection of the liquid crystal layer in the dark-state, this embodiment adopts the first biaxial ¼ wave plate 14 and the second biaxial ¼ wave plate 16 (both ¼ wave plates can incur optical axis deflection in a non-vertical direction) of the material of a biaxial factor of 1.3-1.9 to achieve mutual compensation with the liquid crystal layer, so as to make the polarization state of the light for display tend to be uniform both in the non-vertical (oblique view) direction and in the vertical direction, thereby depressing light leakage in the non-vertical direction and improve viewing angle characteristics. The numeric value for the biaxial factor of the first biaxial ¼ wave plate 14 and second biaxial ¼ wave plate can be selected within the above range of 1.3-1.9 based on the thickness of liquid crystal layer.

FIG. 1 further provides exemplary specific numeric values of the biaxial factors $N_Z$ for the various wave plates.

Figure 2:
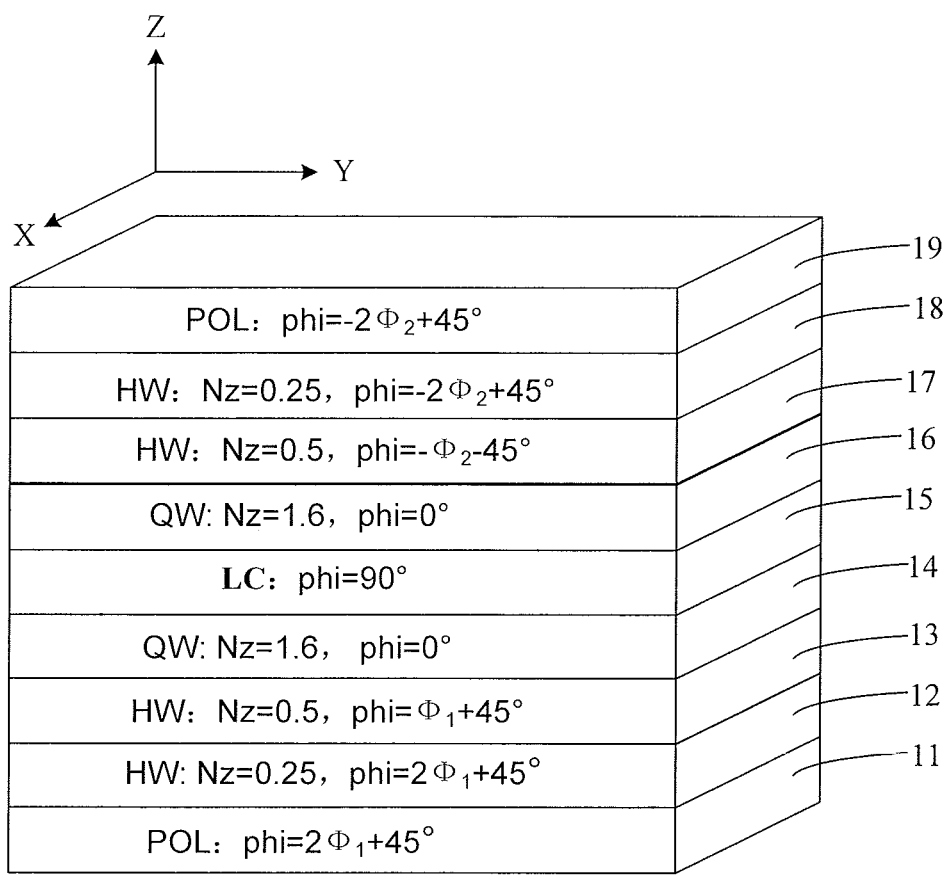
FIG. 2 is a structural schematic view of a liquid crystal display panel according to another embodiment of this disclosure.

Now referring to FIG. 2, based on the embodiment in FIG. 1, the embodiment of FIG. 2 is further provided with a third biaxial ½ wave plate 12 between the first polarizer sheet 11 and first biaxial ½ wave plate 13, the third biaxial ½ being used to cooperate with the first polarizer sheet 11 so as to produce circular polarizer sheet parameters, and further with a fourth biaxial ½ wave plate 18 between the second polarizer sheet 19 and second biaxial ½ wave plate 17, the fourth biaxial ½ wave plate 18 being used to cooperate with the second polarizer sheet 19 so as to generate circular polarizer sheet parameters.

The above configuration of the embodiment in FIG. 2 achieves the effect of improving the viewing angle of liquid crystal display panel by adding a third biaxial ½ wave plate 12 to compensate for the first polarizer sheet 11 and a fourth biaxial ½ wave plate 18 to compensate for the second polarizer sheet 19.

In this embodiment, in the case of the numeric values given above, the examples of specific parameters for the newly added two wave plates 12 and 18 may be as followings.

The azimuth angle of the third biaxial ½ wave plate 12 is $2\Phi_1+45°$, and the numeric range for the biaxial factor $N_z$ is 0.2~0.3; and The azimuth angle of the fourth biaxial ½ wave plate 18 is $-2\Phi_2+45°$, and the numeric range for the biaxial factor NZ is 0.2~0.3.

FIG. 2 further provides specific numeric values of the exemplary biaxial factors $N_Z$ for the various wave plates.

The liquid crystal display panels of transflective type optically compensated bend arrangement (OCB) display mode or transflective type electrically controlled birefringence (ECB) display mode have advantages such as high transmittance, better consistence of the electro-optic characteristic curve (V-T curve), but one significant drawback of the panels of such display modes is poor viewing angle, and it is not easy to be compensated or the cost thereof is too high. The compensating approach for the liquid crystal display panels of the above display modes is made by using a hybrid compensating film and realizes wide-viewing angle display through special angle control process. However, due to the complicated manufacture technology for hybrid compensating films and the special angle control process, the costs thereof are too high.

Figure 3:
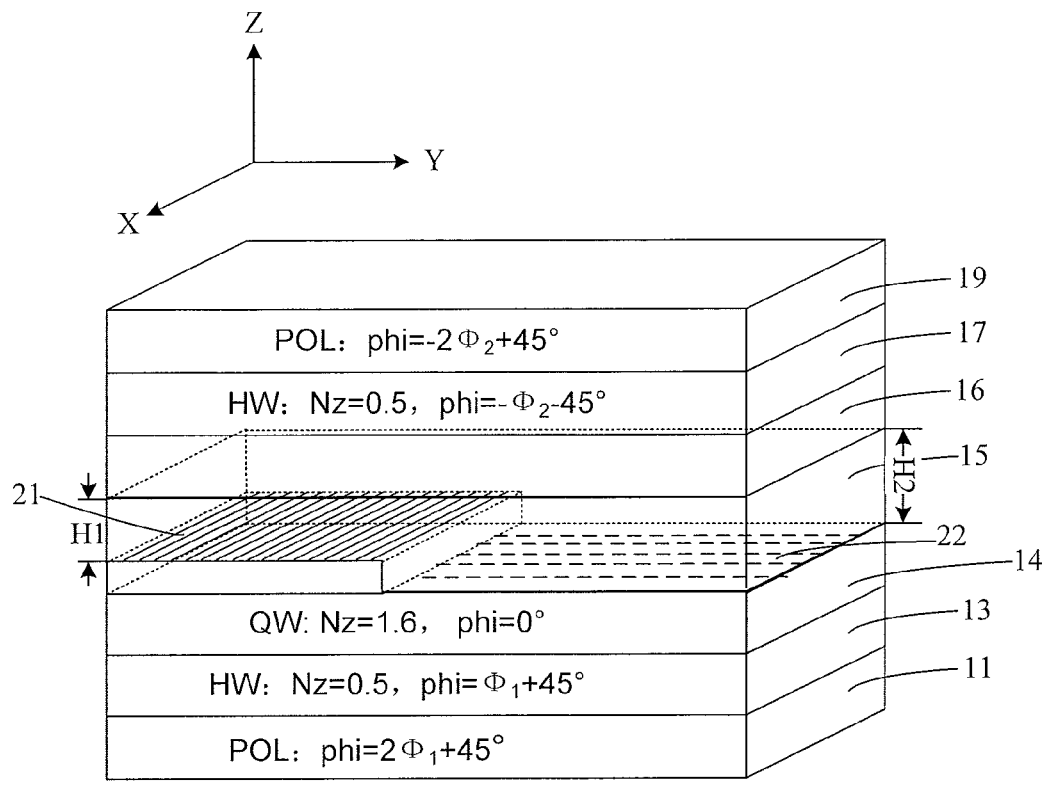
FIG. 3 is a structural schematic view of a liquid crystal display panel according to another embodiment of this disclosure.

The above compensation configuration provided in the embodiment of present disclosure, however, is suitable for the liquid crystal display panel of the transflective type ECB or OCB display mode, and wide-viewing angle display effect can be achieved by modifying material structure in the liquid crystal display panels of such display modes according to the embodiment as shown in FIG. 1 or 2, and the costs thereof are low. Now referring to FIG. 3, a structural schematic view of a liquid crystal display panel of the transflective type ECB or OCB display mode is shown. A reflecting electrode 21 and a transmitting electrode 22 are arranged respectively for the transmitting region and reflecting region of each pixel of the liquid crystal display panel, between the liquid crystal layer 15 and the first biaxial ¼ wave plate. It is can be seen that, in the liquid crystal display panels of above display modes, the thickness H1 of liquid crystal layer in the reflecting region is generally less than the thickness H2 of liquid crystal layer in the transmitting region.

Similarly, in the display panel with the configuration illustrated in FIG. 2, a transmitting electrode and a reflecting electrode may also be provided for the transmitting region and the reflecting region of each pixel of the liquid crystal display panel, and the description thereof is omitted here.

With the liquid crystal display panel illustrated in FIG. 1 or 2, as the driving voltage increases in a dark-state, the liquid crystal arrangement thereof tends to become uniform; therefore, with the liquid crystal display panel with the configuration illustrated in FIG. 1 or 2, a better effect for viewing angle compensation can be achieved in the oblique view directions by increasing the driving voltage for display in the dark-state. In one embodiment, the above-described liquid crystal display panel can also comprise a driving control unit for increasing the liquid crystal driving voltage in the dark-state of the liquid crystal display. The driving control unit can raise the liquid crystal driving voltage so as to improve the effect for viewing angle compensation in the dark-state.

Another embodiment of the disclosure discloses a liquid crystal display (LCD) comprising a liquid crystal display panel according to one of the above-described embodiments. Further, the LCD may comprises a backlight module, driving circuits and the like.

The above described is only the embodiments of present disclosure, it should be noted various modification and refinement can be made by the ordinary skilled in this art without departing from the principle of this disclosure, which should be regarded as the protective scope of this disclosure.

What is claimed is:

1. A liquid crystal display panel, comprising a first polarizer sheet, a liquid crystal layer and a second polarizer sheet from the bottom up in this order,
   wherein a first biaxial ¼ wave plate and a first biaxial ½ wave plate for expanding the wavelength range of the first biaxial ¼ wave plate are provided, in order from the top down, between the liquid crystal layer and the first polarizer sheet; and
   wherein a second biaxial ¼ wave plate and a second biaxial ½ wave plate for expanding the wavelength range of the second biaxial ¼ wave plate are, in order from the bottom up, between the liquid crystal layer and the second polarizer sheet.

2. The liquid crystal display panel according to claim 1, wherein
   an azimuth angle of the first polarizer sheet is $2\Phi_1+45°$;
   an azimuth angle of the first biaxial ½ wave plate is $\Phi_1+45°$, and a numeric range for the biaxial factor is 0.2~0.6;
   an azimuth angle of the first biaxial ¼ wave plate is 0°, and a numeric range for the biaxial factor is 1.3~1.9;
   an azimuth angle of the Liquid crystal layer is 90°;
   an azimuth angle of the second biaxial ¼ wave plate is 0°, and a numeric range for the biaxial factor is 1.3~1.9;
   an azimuth angle of the second biaxial ½ wave plate is $-\Phi_2-45°$, and a numeric range for the biaxial factor is 0.2~0.6; and
   an azimuth angle of the second polarizer sheet is $-2\Phi_2+45°$;
   wherein an numeric range for $\Phi_1$ and $\Phi_2$ is 10°~30°.

3. The liquid crystal display panel according to claim 1, further comprising:
   a third biaxial ½ wave plate located between the first polarizer sheet and the first biaxial ½ wave plate, which is used to cooperate with the first polarizer sheet so as to generate circular polarizer sheet parameters; and
   a fourth biaxial ½ wave plate located between the second polarizer sheet and the second biaxial ½ wave plate, which is used to cooperate with the second polarizer sheet so as to generate circular polarizer sheet parameters.

4. The liquid crystal display panel according to claim 3, wherein an azimuth angle of the first polarizer sheet is $2\Phi_1+45°$; an azimuth angle of the third biaxial ½ wave plate is $2\Phi_1+45°$, and a numeric range for the biaxial factor is 0.2~0.3;
   an azimuth angle of the first biaxial ½ wave plate is $\Phi_1+45°$, and a numeric range for the biaxial factor is 0.2~0.6;
   an azimuth angle of the first biaxial ¼ wave plate is 0°, and a numeric range for the biaxial factor is 1.3~1.9;
   an azimuth angle of the liquid crystal layer is 90°;
   an azimuth angle of the second biaxial ¼ wave plate is 0°, and a numeric range for the biaxial factor is 1.3~1.9;
   an azimuth angle of the second biaxial ½ wave plate is $-\Phi_2-45°$, and a numeric range for the biaxial factor is 0.2~0.6;
   an azimuth angle of the fourth biaxial ½ wave plate is $-2\Phi_1+45°$, and a numeric range for the biaxial factor is 0.2~0.3; and
   an azimuth angle of the second polarizer sheet is $-2\Phi_2+45°$;
   wherein a numeric range for $\Phi_1$ and $\Phi_2$ is 10°~30°.

5. The liquid crystal display panel according to claim 1, wherein the display mode of the liquid crystal display panel is a transflective type optically compensated bend arrangement (OCB) display mode or a transflective type electrically controlled birefringence (ECB) display mode.

6. The liquid crystal display panel according to claim 5, wherein a transmitting electrode and a reflecting electrode are provided in a transmitting region and a reflecting region of each pixel of the liquid crystal display panel, respectively, between the liquid crystal layer and the first biaxial ¼ wave plate.

7. The liquid crystal display panel according to claim 5, further comprising:
   driving control unit, used to increase liquid crystal driving voltage in a dark-state so as to improve the effect for viewing angle compensation in the dark-state.

8. A liquid crystal display comprising a liquid crystal display panel according to claim 1.

* * * * *